(12) United States Patent
Chaturvedi et al.

(10) Patent No.: US 8,948,132 B2
(45) Date of Patent: *Feb. 3, 2015

(54) DEVICE AND METHOD FOR MAINTAINING A COMMUNICATION SESSION DURING A NETWORK TRANSITION

(71) Applicant: Damaka, Inc., Richardson, TX (US)

(72) Inventors: Sivakumar Chaturvedi, Allen, TX (US); Satish Gundabathula, Irving, TX (US)

(73) Assignee: Damaka, Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/854,756

(22) Filed: Apr. 1, 2013

(65) Prior Publication Data

US 2013/0227129 A1 Aug. 29, 2013

Related U.S. Application Data

(63) Continuation of application No. 12/203,722, filed on Sep. 3, 2008, now Pat. No. 8,437,307.

(60) Provisional application No. 60/969,688, filed on Sep. 3, 2007.

(51) Int. Cl.
*H04W 4/00* (2009.01)
*H04W 36/00* (2009.01)
(Continued)

(52) U.S. Cl.
CPC ............ *H04W 4/00* (2013.01); *H04W 36/0011* (2013.01); *H04L 69/40* (2013.01); *H04W 36/14* (2013.01)
USPC ........................................ 370/331; 455/435.2

(58) Field of Classification Search
CPC ........................................................ H04W 36/00
USPC ............................................................ 370/331
See application file for complete search history.

(56) References Cited

U.S. PATENT DOCUMENTS 5,442,637 A 8/1995 Nguyen
5,761,309 A 6/1998 Ohashi et al.
(Continued)

FOREIGN PATENT DOCUMENTS

EP 1404082 A2 3/2004
EP 160339 A1 12/2005
(Continued)

OTHER PUBLICATIONS

PCT: International Search Report and Written Opinion for PCT/US2011/024870; Oct. 26, 2011; 12 pages.
(Continued)

*Primary Examiner* — Gerald Smarth
(74) *Attorney, Agent, or Firm* — Howison & Arnott, LLP

(57) ABSTRACT

Provided are a device and method for maintaining a communication session during a network transition. In one example, the method includes monitoring, by a client, a connection with a first network to determine whether a signal strength of the connection falls below a threshold value. The client establishes a connection with a second network if the signal strength of the connection with the first network falls below the threshold value. Establishing the connection with the second network includes obtaining an address and port assignment corresponding to the client from the second network. The client uses the obtained address and port assignment to maintain a communication session during the changeover from the first network to the second network.

20 Claims, 5 Drawing Sheets

(51) Int. Cl.
*H04L 29/14* (2006.01)
*H04W 36/14* (2009.01)

(56) References Cited

U.S. PATENT DOCUMENTS

| | | | |
|---|---|---|---|
| 5,790,637 A | 8/1998 | Johnson et al. | |
| 5,818,447 A | 10/1998 | Wolf et al. | |
| 5,889,762 A | 3/1999 | Pajuvirta et al. | |
| 5,930,714 A * | 7/1999 | Abu-Amara et al. | 455/442 |
| 6,031,818 A | 2/2000 | Lo et al. | |
| 6,128,283 A | 10/2000 | Sabaa et al. | |
| 6,141,687 A | 10/2000 | Blair | |
| 6,161,082 A | 12/2000 | Goldberg et al. | |
| 6,202,084 B1 | 3/2001 | Kumar et al. | |
| 6,219,638 B1 | 4/2001 | Padmanabhan et al. | |
| 6,298,129 B1 | 10/2001 | Culver et al. | |
| 6,311,150 B1 | 10/2001 | Ramaswamy et al. | |
| 6,343,067 B1 | 1/2002 | Drottar et al. | |
| 6,360,196 B1 | 3/2002 | Poznanski et al. | |
| 6,389,016 B1 | 5/2002 | Sabaa et al. | |
| 6,438,376 B1 | 8/2002 | Elliott et al. | |
| 6,473,425 B1 | 10/2002 | Bellaton et al. | |
| 6,574,668 B1 | 6/2003 | Gubbi et al. | |
| 6,741,691 B1 | 5/2004 | Ritter et al. | |
| 6,754,181 B1 | 6/2004 | Elliott et al. | |
| 6,766,373 B1 | 7/2004 | Beadle et al. | |
| 6,826,613 B1 | 11/2004 | Wang et al. | |
| 6,836,765 B1 | 12/2004 | Sussman | |
| 6,842,460 B1 | 1/2005 | Olkkonen et al. | |
| 6,850,769 B2 | 2/2005 | Grob et al. | |
| 6,898,413 B2 | 5/2005 | Yip et al. | |
| 6,912,278 B1 | 6/2005 | Hamilton | |
| 6,940,826 B1 | 9/2005 | Simard et al. | |
| 6,963,555 B1 | 11/2005 | Brenner et al. | |
| 6,975,718 B1 | 12/2005 | Pearce et al. | |
| 6,987,756 B1 | 1/2006 | Ravindranath et al. | |
| 6,999,575 B1 | 2/2006 | Sheinbein | |
| 6,999,932 B1 | 2/2006 | Zhou | |
| 7,006,508 B2 | 2/2006 | Bondy et al. | |
| 7,010,109 B2 | 3/2006 | Gritzer et al. | |
| 7,013,155 B1 | 3/2006 | Ruf et al. | |
| 7,079,529 B1 | 7/2006 | Khuc | |
| 7,080,158 B1 | 7/2006 | Squire | |
| 7,092,385 B2 | 8/2006 | Gallant et al. | |
| 7,117,526 B1 | 10/2006 | Short | |
| 7,123,710 B2 | 10/2006 | Ravishankar | |
| 7,184,415 B2 | 2/2007 | Chaney et al. | |
| 7,185,114 B1 | 2/2007 | Hariharasubrahmanian | |
| 7,272,377 B2 | 9/2007 | Cox et al. | |
| 7,302,496 B1 | 11/2007 | Metzger | |
| 7,304,985 B2 | 12/2007 | Sojka et al. | |
| 7,345,999 B2 | 3/2008 | Su et al. | |
| 7,346,044 B1 | 3/2008 | Chou et al. | |
| 7,353,252 B1 | 4/2008 | Yang et al. | |
| 7,353,255 B2 | 4/2008 | Acharya et al. | |
| 7,412,374 B1 | 8/2008 | Seiler et al. | |
| 7,457,279 B1 | 11/2008 | Scott et al. | |
| 7,477,282 B2 | 1/2009 | Firestone et al. | |
| 7,487,248 B2 | 2/2009 | Moran et al. | |
| 7,512,652 B1 | 3/2009 | Appelman et al. | |
| 7,542,472 B1 | 6/2009 | Gerendai et al. | |
| 7,564,843 B2 | 7/2009 | Manjunatha et al. | |
| 7,570,743 B2 | 8/2009 | Barclay et al. | |
| 7,574,523 B2 | 8/2009 | Traversat et al. | |
| 7,590,758 B2 | 9/2009 | Takeda et al. | |
| 7,613,171 B2 | 11/2009 | Zehavi et al. | |
| 7,623,476 B2 | 11/2009 | Ravikumar et al. | |
| 7,623,516 B2 | 11/2009 | Chaturvedi et al. | |
| 7,656,870 B2 | 2/2010 | Ravikumar et al. | |
| 7,664,495 B1 | 2/2010 | Bonner et al. | |
| 7,729,700 B2 * | 6/2010 | Alemany et al. | 455/436 |
| 7,769,881 B2 | 8/2010 | Matsubara et al. | |
| 7,774,495 B2 | 8/2010 | Pabla et al. | |
| 7,778,187 B2 | 8/2010 | Chaturvedi et al. | |
| 7,782,866 B1 | 8/2010 | Walsh et al. | |
| 7,805,140 B2 * | 9/2010 | Friday et al. | 455/436 |
| 7,894,383 B2 * | 2/2011 | Ikeda et al. | 370/328 |
| 7,917,584 B2 | 3/2011 | Arthursson | |
| 8,009,586 B2 | 8/2011 | Chaturvedi et al. | |
| 8,065,418 B1 | 11/2011 | Abuan et al. | |
| 8,639,248 B2 * | 1/2014 | Giustina et al. | 455/436 |
| 2001/0050923 A1 | 12/2001 | Park et al. | |
| 2002/0031212 A1 | 3/2002 | O'Neil et al. | |
| 2002/0037000 A1 | 3/2002 | Park et al. | |
| 2002/0038282 A1 | 3/2002 | Montgomery | |
| 2002/0042769 A1 | 4/2002 | Gujral et al. | |
| 2002/0062285 A1 | 5/2002 | Amann et al. | |
| 2002/0064167 A1 | 5/2002 | Khan et al. | |
| 2002/0080719 A1 | 6/2002 | Parkvall et al. | |
| 2002/0087887 A1 | 7/2002 | Busam et al. | |
| 2002/0097150 A1 | 7/2002 | Sandelman et al. | |
| 2002/0120757 A1 | 8/2002 | Sutherland et al. | |
| 2002/0124096 A1 | 9/2002 | Loguinov et al. | |
| 2002/0143548 A1 | 10/2002 | Korall et al. | |
| 2002/0150110 A1 | 10/2002 | Inbar et al. | |
| 2002/0152325 A1 | 10/2002 | Elgebaly et al. | |
| 2002/0156844 A1 | 10/2002 | Maehiro | |
| 2002/0166053 A1 | 11/2002 | Wilson | |
| 2002/0173303 A1 | 11/2002 | Shibutani | |
| 2002/0176404 A1 | 11/2002 | Girard | |
| 2002/0178087 A1 | 11/2002 | Henderson et al. | |
| 2002/0184310 A1 | 12/2002 | Traversat et al. | |
| 2003/0009565 A1 | 1/2003 | Arao | |
| 2003/0031210 A1 | 2/2003 | Harris | |
| 2003/0035441 A1 | 2/2003 | Cheng et al. | |
| 2003/0043764 A1 | 3/2003 | Kim et al. | |
| 2003/0044020 A1 | 3/2003 | Aboba et al. | |
| 2003/0046056 A1 | 3/2003 | Godoy et al. | |
| 2003/0046585 A1 | 3/2003 | Minnick | |
| 2003/0061025 A1 | 3/2003 | Abir | |
| 2003/0061481 A1 | 3/2003 | Levine et al. | |
| 2003/0072485 A1 | 4/2003 | Guerin et al. | |
| 2003/0076815 A1 | 4/2003 | Miller et al. | |
| 2003/0078858 A1 | 4/2003 | Angelopoulos et al. | |
| 2003/0088676 A1 | 5/2003 | Smith et al. | |
| 2003/0105812 A1 | 6/2003 | Flowers, Jr. et al. | |
| 2003/0110047 A1 | 6/2003 | Santosuosso | |
| 2003/0115251 A1 | 6/2003 | Fredrickson et al. | |
| 2003/0126213 A1 | 7/2003 | Betzler | |
| 2003/0135569 A1 | 7/2003 | Khakoo et al. | |
| 2003/0137939 A1 | 7/2003 | Dunning et al. | |
| 2003/0158722 A1 | 8/2003 | Lord | |
| 2003/0163525 A1 | 8/2003 | Hendriks et al. | |
| 2003/0163697 A1 | 8/2003 | Pabla et al. | |
| 2003/0172145 A1 | 9/2003 | Nguyen | |
| 2003/0174707 A1 | 9/2003 | Grob et al. | |
| 2003/0177186 A1 | 9/2003 | Goodman et al. | |
| 2003/0177422 A1 | 9/2003 | Tararoukhine et al. | |
| 2003/0187650 A1 | 10/2003 | Moore et al. | |
| 2003/0202480 A1 | 10/2003 | Swami | |
| 2003/0212772 A1 | 11/2003 | Harris | |
| 2003/0214955 A1 | 11/2003 | Kim | |
| 2003/0217171 A1 | 11/2003 | Von Stuermer et al. | |
| 2003/0217318 A1 | 11/2003 | Choi | |
| 2003/0220121 A1 | 11/2003 | Konishi et al. | |
| 2003/0229715 A1 | 12/2003 | Baratakke et al. | |
| 2004/0005877 A1 | 1/2004 | Vaananen | |
| 2004/0024879 A1 | 2/2004 | Dingman et al. | |
| 2004/0034776 A1 | 2/2004 | Fernando et al. | |
| 2004/0034793 A1 | 2/2004 | Yuan | |
| 2004/0039781 A1 | 2/2004 | LaVallee et al. | |
| 2004/0044517 A1 | 3/2004 | Palmquist | |
| 2004/0052234 A1 | 3/2004 | Ameigeiras et al. | |
| 2004/0062267 A1 | 4/2004 | Minami et al. | |
| 2004/0068567 A1 | 4/2004 | Moran et al. | |
| 2004/0100973 A1 | 5/2004 | Prasad | |
| 2004/0103212 A1 | 5/2004 | Takeuchi et al. | |
| 2004/0128554 A1 | 7/2004 | Maher, III et al. | |
| 2004/0133689 A1 | 7/2004 | Vasisht | |
| 2004/0139225 A1 | 7/2004 | Takahashi | |
| 2004/0139228 A1 | 7/2004 | Takeda et al. | |
| 2004/0139230 A1 | 7/2004 | Kim | |
| 2004/0143678 A1 | 7/2004 | Chari et al. | |
| 2004/0148434 A1 | 7/2004 | Matsubara et al. | |

(56) References Cited

U.S. PATENT DOCUMENTS

| | | |
|---|---|---|
| 2004/0153858 A1 | 8/2004 | Hwang |
| 2004/0158471 A1 | 8/2004 | Davis et al. |
| 2004/0162871 A1 | 8/2004 | Pabla et al. |
| 2004/0203834 A1 | 10/2004 | Mahany |
| 2004/0213184 A1 | 10/2004 | Hu et al. |
| 2004/0228279 A1 | 11/2004 | Midtun et al. |
| 2004/0240399 A1 | 12/2004 | Corrao et al. |
| 2004/0249953 A1 | 12/2004 | Fernandez et al. |
| 2004/0260952 A1 | 12/2004 | Newman et al. |
| 2004/0267527 A1 | 12/2004 | Creamer et al. |
| 2004/0267938 A1 | 12/2004 | Shoroff et al. |
| 2004/0268257 A1 | 12/2004 | Mudusuru |
| 2005/0004982 A1 | 1/2005 | Vernon et al. |
| 2005/0008024 A1 | 1/2005 | Newpol et al. |
| 2005/0015502 A1 | 1/2005 | Kang et al. |
| 2005/0033843 A1 | 2/2005 | Shahi et al. |
| 2005/0033985 A1 | 2/2005 | Xu et al. |
| 2005/0050227 A1 | 3/2005 | Michelman |
| 2005/0071481 A1 | 3/2005 | Danieli |
| 2005/0086309 A1 | 4/2005 | Galli et al. |
| 2005/0091407 A1 | 4/2005 | Vaziri et al. |
| 2005/0105524 A1 | 5/2005 | Stevens et al. |
| 2005/0119005 A1 | 6/2005 | Segal et al. |
| 2005/0120073 A1 | 6/2005 | Cho |
| 2005/0130650 A1 | 6/2005 | Creamer et al. |
| 2005/0132009 A1 | 6/2005 | Solie |
| 2005/0136911 A1* | 6/2005 | Csapo et al. ............ 455/423 |
| 2005/0138119 A1 | 6/2005 | Saridakis |
| 2005/0138128 A1 | 6/2005 | Baniel et al. |
| 2005/0143105 A1 | 6/2005 | Okamoto |
| 2005/0144288 A1 | 6/2005 | Liao |
| 2005/0187781 A1 | 8/2005 | Christensen |
| 2005/0187957 A1 | 8/2005 | Kramer et al. |
| 2005/0195802 A1 | 9/2005 | Klein et al. |
| 2005/0198499 A1 | 9/2005 | Salapaka et al. |
| 2005/0201357 A1 | 9/2005 | Poyhonen |
| 2005/0201485 A1 | 9/2005 | Fay |
| 2005/0208947 A1 | 9/2005 | Bahl |
| 2005/0220017 A1 | 10/2005 | Brand et al. |
| 2005/0246193 A1 | 11/2005 | Roever et al. |
| 2005/0249196 A1 | 11/2005 | Ansari et al. |
| 2005/0254440 A1 | 11/2005 | Sorrell |
| 2005/0270992 A1 | 12/2005 | Sanzgiri et al. |
| 2005/0286519 A1 | 12/2005 | Ravikumar et al. |
| 2006/0002355 A1 | 1/2006 | Baek et al. |
| 2006/0062180 A1 | 3/2006 | Sayeedi et al. |
| 2006/0069775 A1 | 3/2006 | Artobello et al. |
| 2006/0072506 A1 | 4/2006 | Sayeedi et al. |
| 2006/0120375 A1 | 6/2006 | Ravikumar et al. |
| 2006/0121902 A1 | 6/2006 | Jagadeesan et al. |
| 2006/0121986 A1 | 6/2006 | Pelkey et al. |
| 2006/0148516 A1 | 7/2006 | Reddy et al. |
| 2006/0165029 A1 | 7/2006 | Melpignano et al. |
| 2006/0168643 A1 | 7/2006 | Howard et al. |
| 2006/0171534 A1 | 8/2006 | Baughman |
| 2006/0182100 A1 | 8/2006 | Li et al. |
| 2006/0183476 A1 | 8/2006 | Morita et al. |
| 2006/0187926 A1 | 8/2006 | Imai |
| 2006/0195402 A1 | 8/2006 | Malina et al. |
| 2006/0203750 A1 | 9/2006 | Ravikumar et al. |
| 2006/0205436 A1 | 9/2006 | Liu et al. |
| 2006/0218624 A1 | 9/2006 | Ravikumar et al. |
| 2006/0230166 A1 | 10/2006 | Philyaw |
| 2006/0246903 A1 | 11/2006 | Kong et al. |
| 2006/0258289 A1 | 11/2006 | Dua |
| 2007/0016921 A1 | 1/2007 | Levi et al. |
| 2007/0019545 A1 | 1/2007 | Alt et al. |
| 2007/0025270 A1 | 2/2007 | Sylvain |
| 2007/0078785 A1 | 4/2007 | Bush et al. |
| 2007/0082671 A1 | 4/2007 | Feng et al. |
| 2007/0090184 A1* | 4/2007 | Lockwood et al. ........... 235/380 |
| 2007/0110043 A1 | 5/2007 | Girard |
| 2007/0111794 A1 | 5/2007 | Hogan et al. |
| 2007/0116224 A1 | 5/2007 | Burke et al. |
| 2007/0130253 A1 | 6/2007 | Newson et al. |
| 2007/0136459 A1 | 6/2007 | Roche et al. |
| 2007/0165629 A1 | 7/2007 | Chaturvedi et al. |
| 2007/0190987 A1 | 8/2007 | Vaananen |
| 2007/0206563 A1 | 9/2007 | Silver et al. |
| 2007/0239892 A1 | 10/2007 | Ott et al. |
| 2007/0253435 A1 | 11/2007 | Keller et al. |
| 2007/0260359 A1 | 11/2007 | Benson et al. |
| 2007/0274276 A1 | 11/2007 | Laroia et al. |
| 2007/0297430 A1 | 12/2007 | Nykanen et al. |
| 2008/0005328 A1 | 1/2008 | Shively et al. |
| 2008/0019285 A1 | 1/2008 | John et al. |
| 2008/0032695 A1* | 2/2008 | Zhu et al. ............ 455/442 |
| 2008/0069105 A1 | 3/2008 | Costa et al. |
| 2008/0080392 A1 | 4/2008 | Walsh et al. |
| 2008/0091813 A1 | 4/2008 | Bodlaender |
| 2008/0123685 A1 | 5/2008 | Varma et al. |
| 2008/0130639 A1 | 6/2008 | Costa-Requena et al. |
| 2008/0168440 A1 | 7/2008 | Regnier et al. |
| 2008/0192756 A1 | 8/2008 | Damola et al. |
| 2008/0235362 A1 | 9/2008 | Kjesbu et al. |
| 2008/0235511 A1 | 9/2008 | O'Brien et al. |
| 2008/0250408 A1 | 10/2008 | Tsui et al. |
| 2008/0273541 A1 | 11/2008 | Pharn |
| 2008/0320096 A1 | 12/2008 | Szeto |
| 2009/0003322 A1 | 1/2009 | Isumi |
| 2009/0006076 A1 | 1/2009 | Jindal |
| 2009/0052399 A1 | 2/2009 | Silver et al. |
| 2009/0055473 A1 | 2/2009 | Synnergren |
| 2009/0088150 A1 | 4/2009 | Chaturvedi et al. |
| 2009/0136016 A1 | 5/2009 | Gornoi et al. |
| 2009/0156217 A1 | 6/2009 | Bajpai |
| 2009/0182815 A1 | 7/2009 | Czechowski et al. |
| 2009/0192976 A1 | 7/2009 | Spivack et al. |
| 2009/0234967 A1 | 9/2009 | Yu et al. |
| 2009/0240821 A1 | 9/2009 | Juncker et al. |
| 2009/0257433 A1 | 10/2009 | Mutikainen et al. |
| 2009/0300673 A1 | 12/2009 | Bachet et al. |
| 2009/0327516 A1 | 12/2009 | Amishima et al. |
| 2010/0011108 A1 | 1/2010 | Clark et al. |
| 2010/0011111 A1 | 1/2010 | Vizaei |
| 2010/0049980 A1 | 2/2010 | Barriga et al. |
| 2010/0077023 A1 | 3/2010 | Eriksson |
| 2010/0107205 A1 | 4/2010 | Foti |
| 2010/0128696 A1* | 5/2010 | Fantini et al. ............ 370/331 |
| 2010/0223047 A1 | 9/2010 | Christ |
| 2010/0279670 A1 | 11/2010 | Ghai et al. |
| 2010/0299150 A1 | 11/2010 | Fein et al. |
| 2010/0299313 A1 | 11/2010 | Orsini et al. |
| 2010/0312832 A1 | 12/2010 | Allen et al. |
| 2010/0312897 A1 | 12/2010 | Allen et al. |
| 2011/0040836 A1 | 2/2011 | Allen et al. |
| 2011/0099612 A1 | 4/2011 | Lee et al. |
| 2011/0122864 A1 | 5/2011 | Cherifi et al. |
| 2011/0145687 A1 | 6/2011 | Grigsby et al. |
| 2011/0314134 A1 | 12/2011 | Foti |
| 2012/0263144 A1 | 10/2012 | Nix |

FOREIGN PATENT DOCUMENTS

| | | |
|---|---|---|
| EP | 1638275 A2 | 3/2006 |
| EP | 1848163 A1 | 10/2007 |
| EP | 1988697 A1 | 11/2008 |
| EP | 1988698 A1 | 11/2008 |
| JP | 2005-94600 | 4/2005 |
| JP | 2007-043598 | 2/2007 |
| KR | 10-2005-0030548 | 3/2005 |
| WO | WO 03/079635 | 9/2003 |
| WO | WO 2004/063843 | 7/2004 |
| WO | WO 2005/009019 | 1/2005 |
| WO | 2006064047 A1 | 6/2006 |
| WO | WO 2006/075677 A1 | 7/2006 |

OTHER PUBLICATIONS

J. Rosenberg et al. "Session Traversal Utilities for NAT (STUN)", draft-iett-behave-rtc3489bis-06, Mar. 5, 2007.

PCT: International Search Report and Written Opinion for PCT/US2011/028685; Nov. 9, 2011; 10 pages.

(56) References Cited

OTHER PUBLICATIONS

PCT: International Search Report and Written Opinion for PCT/US2011/029954; Nov. 24, 2011; 8 pages.
PCT: International Search Report and Written Opinion for PCT/US2011/024891; Nov. 25, 2011; 9 pages.
PCT: International Search Report and Written Opinion for PCT/US2011/031245; Dec. 26, 2011; 13 pages.
Wireless Application Protocol—Wireless Transport Layer Security Specification, Version Feb. 18, 2000, Wireless Application Forum, Ltd. 2000; 99 pages.
PCT: International Search Report and Written Opinion for PCT/US2011/040864; Feb. 17, 2012; 8 pages.
PCT: International Search Report and Written Opinion for PCT/US2011/041565; Jan. 5, 2012; 7 pages.
PCT: International Search Report and Written Opinion for PCT/US2011/031246; Dec. 27, 2011; 8 pages.
PCT: International Search Report and Written Opinion for PCT/US2011/049000; Mar. 27, 2012; 10 pages.
PCT: International Search Report and Written Opinion for PCT/US2011/051877; Apr. 13, 2012; 7 pages.
PCT: International Search Report and Written Opinion for PCT/US2011/055101; May 22, 2012; 9 pages.
Balamurugan Karpagavinayagam et al. (Monitoring Architecture for Lawful Interception in VoIP Networks, ICIMP 2007, Aug. 24, 2008).
NiceLog User's Manual 385A0114-08 Rev. A2, Mar. 2004.
WISPA: Wireless Internet Service Providers Association; WISPA-CS-IPNA-2.0; May 1, 2009.
PCT: International Preliminary Report on Patentability of PCT/US2011/024870; Aug. 30, 2012; 7 pgs.
RFC 5694 ("Peer-to-Peer (P2P) Architecture: Definition, Taxonomies, Examples, and Applicability", Nov. 2009).
Mahy et al., The Session Initiation Protocol (SIP) "Replaces" Header, Sep. 2004, RFC 3891, pp. 1-16.
PCT: International Preliminary Report on Patentability of PCT/US2011/024891; Aug. 30, 2012; 6 pgs.
T. Dierks & E. Rescorla, The Transport Layer Security (TLS) Protocol (Ver. 1.2, Aug. 2008) retrieved at http://tools.ietf.org/htmllrfc5246.
J. Rosenberg et al., SIP: Session Initiation Protocol (Jun. 2008) retrieved at http://tools.ietf.org/html/rfc3261.
Philippe Bazot et al., Developing SIP and IP Multimedia Subsystem (IMS) Applications (Feb. 5, 2007) retrieved at redbooks IBM form No. SG24-7255-00.
PCT: International Preliminary Report on Patentability of PCT/US2011/028685; Oct. 4, 2012; 6 pgs.
PCT: International Preliminary Report on Patentability of PCT/US2011/031245; Oct. 26, 2012; 9 pgs.
PCT: International Preliminary Report on Patentability of PCT/US2011/029954; Oct. 11, 2012; 5 pgs.
PCT: International Preliminary Report on Patentability of PCT/US2011/031246; Nov. 8, 2012; 5 pgs.
Rosenberg, J; "Interactive Connectivity Establishment (ICE): A Protocol for Network Address Translator (NAT) Traversal for Offer/Answer Protocols"; Oct. 29, 2007; I ETF; I ETF draft of RFC 5245, draft-ietf-mmusic-ice-19; pp. 1-120.
Blanchet et al; "IPv6 Tunnel Broker with the Tunnel Setup Protocol (TSP)"; May 6, 2008; IETF; IETF draft of RFC 5572, draftblanchet-v6ops-tunnelbroker-tsp-04; pp. 1-33.
Cooper et al; "NAT Traversal for dSIP"; Feb. 25, 2007; IETF; IETF draft draft-matthews-p2psip-dsip-nat-traversal-00; pp. 1-23.
Cooper et al; "The Effect of NATs on P2PSIP Overlay Architecture"; IETF; IETF draft draft-matthews-p2psip-nats-and-overlays-01.txt; pp. 1-20.
Srisuresh et al; "State of Peer-to-Peer(P2P) Communication Across Network Address Translators(NATs)"; Nov. 19, 2007; I ETF; I ETF draft for RFC 5128, draft-ietf-behave-p2p-state-06.txt; pp. 1-33.
PCT: International Search Report and Written Opinion for PCT/US2012/046026; Oct. 18, 2012; 6 pages.
Dunigan, Tom, "Almost TCP over UDP (atou)," last modified Jan. 12, 2004; retrieved on Jan. 18, 2011 from <http://www.csm.ornl.gov/~dunigan/net100/atou.html> 18 pgs.
PCT: International Preliminary Report on Patentability of PCT/US2011/040864; Jan. 3, 2013; 6 pgs.
PCT: International Preliminary Report on Patentability of PCT/US2011/041565; Jan. 10, 2013; 6 pgs.
PCT: International Preliminary Report on Patentability of PCT/US2011/049000; Feb. 26, 2013; 6 pgs.
PCT: International Preliminary Report on Patentability of PCT/US2011/051877; Mar. 26, 2013; 5 pgs.
PCT: International Preliminary Report on Patentability of PCT/US2011/055101; Apr. 16, 2013; 7 pgs.
PCT: International Preliminary Report on Patentability of PCT/US2008/075141; Mar. 9, 2010; 5 pgs.
PCT: International Preliminary Report on Patentability of PCT/US2007/068820; Dec. 31, 2008; 8 pgs.
PCT: International Preliminary Report on Patentability of PCT/US2007/068823; Nov. 27, 2008; 8 pgs.
PCT: International Preliminary Report on Patentability of PCT/US2006/047841; Nov. 6, 2008; 7 pgs.
PCT: International Preliminary Report on Patentability of PCT/US2007/002424; Aug. 7, 2008; 6 pgs.
PCT: International Preliminary Report on Patentability of PCT/US2006/040312; May 2, 2008; 5 pgs.
PCT: International Preliminary Report on Patentability of PCT/IB2005/000821; Oct. 19, 2006; 10 pgs.
Chathapuram, "Security in Peer-To-Peer Networks", Aug. 8. 2001, XP002251813.
International Search Report and Written Opinion of the International Searching Authority from PCT/IB2005/000821, dated Aug. 5, 2005.
International Search Report and Written Opinion of the International Searching Authority from PCT/US2006/032791, dated Dec. 18, 2006.
International Search Report and Written Opinion of the International Searching Authority from PCT/US2006/040312, dated Mar. 2, 2007.
International Search Report and Written Opinion of the International Searching Authority from PCT/US2006/047841, dated Sep. 12, 2008.
International Search Report and Written Opinion of the International Searching Authority from PCT/US2007/002424, dated Aug. 14, 2007.
International Search Report and Written Opinion of the International Searching Authority from PCT/US2007/068820, dated Jun. 11, 2008.
International Search Report and Written Opinion of the International Searching Authority from PCT/US2007/068821, dated Jun. 14, 2008.
International Search Report and Written Opinion of the International Searching Authority from PCT/US2007068823, dated Jun. 1, 2008.
Jeff Tyson, "How Instant Messaging Works", www.verizon.com/learningcenter, Mar. 9, 2005.
Rory Bland, et al,"P2P Routing" Mar. 2002.
Rosenberg, "STUN—Simple Traversal of UDP Through NAT", Sep. 2002, XP015005058.
Salman A. Baset, et al, "An Analysis of the Skype Peer-To-Peer Internet Telephony Protocol", Department of Computer Science, Columbia University, New York, NY, USA, Sep. 15, 2004.
Singh et al., "Peer-to Peer Internet Telephony Using SIP", Department of Computer Science, Columbia University, Oct. 31, 2004, XP-002336408.
Sinha, S. and Oglieski, A., A TCP Tutorial, Nov. 1998 (Date posted on Internet: Apr. 19, 2001) [Retrieved from the Internet <URL:http//www.ssfnet.org/Exchange/tcp/tcpTutorialNotes.html>].
Pejman Khadivi, Terence D. Todd and Dongmei Zhao, "Handoff trigger nodes for hybrid IEEE 802.11 WLAN/cellular networks," Proc. of IEEE International Conference on Quality of Service in Heterogeneous Wired/Wireless Networks, pp. 164-170, Oct. 18, 2004.

(56) References Cited

OTHER PUBLICATIONS

International Search Report and Written Opinion of the International Searching Authority from PCT/US2008/078142, dated Mar. 27, 2009.

International Search Report and Written Opinion of the International Searching Authority from PCT/US2008/084950, dated Apr. 27, 2009.

Hao Wang, Skype VoIP service-architecture and comparison, In: INFOTECH Seminar Advanced Communication Services (ASC), 2005, pp. 4, 7, 8.

Seta, N.; Miyajima, H.; Zhang, L;; Fujii, T., "All-SIP Mobility: Session Continuity on Handover in Heterogeneous Access Environment," Vehicular Technology Conference, 2007. VTC 2007-Spring. IEEE 65th, Apr. 22-25, 2007, pp. 1121-1126.

International Search Report and Written Opinion of the International Searching Authority from PCT/US2008/075141, dated Mar. 5, 2009.

Qian Zhang; Chuanxiong Guo; Zihua Guo; Wenwu Zhu, "Efficient mobility management for vertical handoff between WWAN and WLAN," Communications Magazine, IEEE, vol. 41. issue 11, Nov. 2003, pp. 102-108.

Isaacs, Ellen et al., "Hubbub: A sound-enhanced mobile instant messenger that supports awareness and opportunistic interactions," Proceedings of the SIGCHI Conference on Human Factors in Computing Systems; vol. 4, Issue No. 1; Minneapolis, Minnesota; Apr. 20-25, 2002; pp. 179-186.

PCT: International Preliminary Report on Patentability of PCT/US2008/084950; Jun. 1, 2010; 5 pgs.

\* cited by examiner

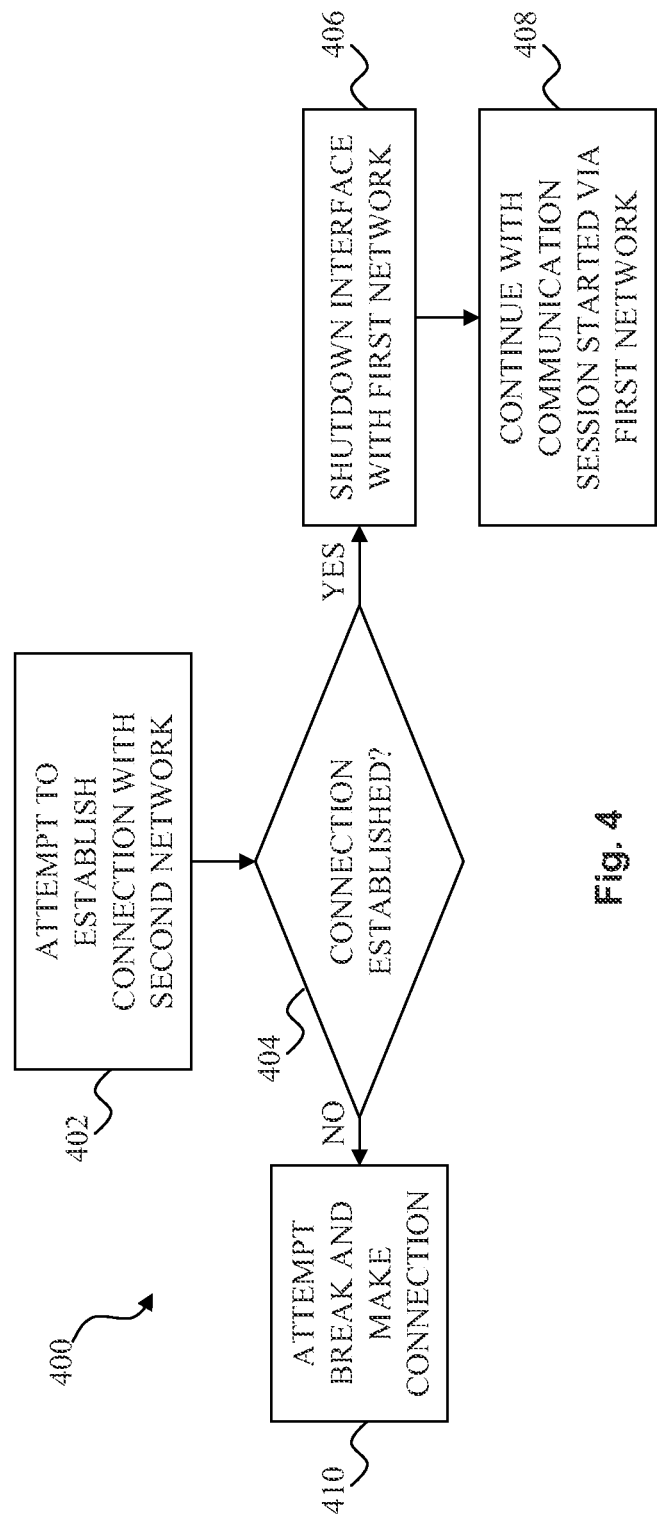

DEVICE AND METHOD FOR MAINTAINING A COMMUNICATION SESSION DURING A NETWORK TRANSITION

CROSS-REFERENCE TO RELATED APPLICATIONS

This application is a continuation of U.S. patent application Ser. No. 12/203,722, filed Sep. 3, 2008, entitled DEVICE AND METHOD FOR MAINTAINING A COMMUNICATION SESSION DURING A NETWORK TRANSITION which claims benefit of U.S. Provisional Application No. 60/969,688, filed Sep. 3, 2007, entitled SYSTEM AND METHOD FOR MAINTAINING A COMMUNICATION SESSION DURING A NETWORK TRANSITION, the specifications of which are incorporated herein in their entirety.

The present application is related to U.S. patent application Ser. No. 11/214,648, filed on Aug. 30, 2005, which is a continuation-in-part of U.S. patent application Ser. No. 11/081,068, filed on Mar. 15, 2005, which claims the benefit of U.S. Provisional Patent Ser. Nos. 60/583,536, filed Jun. 29, 2004, 60/628,183, filed Nov. 15, 2004, and 60/628,291, filed Nov. 17, 2004, all of which are hereby incorporated by reference

BACKGROUND

A modern communication device may need to switch networks due to mobility of the device and other reasons. As such, network switching may occur while the device is maintaining a data and/or voice connection. Forcing the user to reestablish the connection after the network switch occurs is inconvenient and improved methods and devices are needed for handling network switches.

BRIEF DESCRIPTION OF THE DRAWINGS

For a more complete understanding, reference is now made to the following description taken in conjunction with the accompanying Drawings in which:

FIG. 4 is a flowchart illustrating one embodiment of a method for maintaining a communication session within the environment of FIG. 1A during a make and break network transition.

DETAILED DESCRIPTION

Figure 1A:
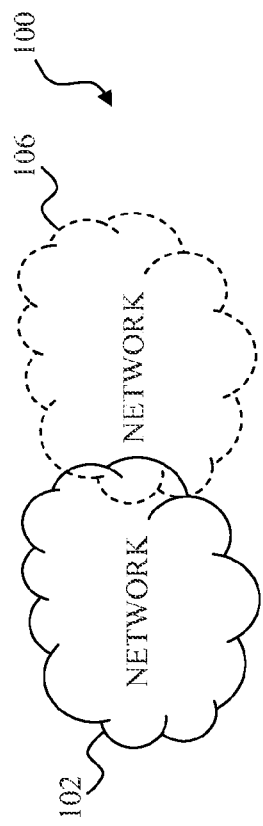
FIG. 1A is an embodiment of a communications environment.

The present disclosure is directed to a system and method for networked communications. It is understood that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1A, in one embodiment, a communications environment 100 includes a client 104 is coupled to a network 102. For purposes of example, the client 104 is coupled to the network 102 via a wireless connection, but it is understood that the present disclosure may be applied to a wired connection. A second network 106 (also a wireless network in the present example) is also present in the environment 100. Partial or total overlap may occur between the networks 102 and 106.

The network 102 and network 106 may be the same type of network or may be different types of networks. Exemplary network types include wideband digital communication systems such as wireless local area networks (LANs) (e.g., IEEE 802.11a and 802.11g wi-fi networks), digital audio broadcasting systems (e.g., HD Radio, T-DMB and ISDB-TSB), terrestrial digital television systems (e.g., DVB-T, DVB-H, T-DMB and ISDB-T), WiMax wireless metropolitan area networks (MANs) (e.g., IEEE 802.16 networks), Mobile Broadband Wireless Access (MBWA) networks (e.g., IEEE 802.20 networks), Ultra Mobile Broadband (UMB) systems, Flash-OFDM cellular systems, and Ultra wideband (UWB) systems. Furthermore, the present disclosure may be used with Global System for Mobile communications (GSM) and/or code division multiple access (CDMA) communications systems. In some embodiments, one or both of the networks 102 and 106 may be a hybrid peer-to-peer network as described in previously incorporated U.S. patent application Ser. No. 11/081,068.

The client 104 may be any device capable of receiving and sending information via a wired or wireless network, and may include processing capabilities to handle such information. Such devices include both stationary and mobile computers, cell phones, personal digital assistants (PDAs), and pagers. In some embodiments, the client 104 may be an endpoint as described in previously incorporated U.S. patent application Ser. No. 11/081,068. In the present example, the client 104 uses a connectionless protocol such as the User Datagram Protocol (UDP), but may use other protocols (e.g., a connection based protocol such as TCP/IP) in other embodiments.

In the present example, the client 104 may switch from the network 102 to the network 106 for a number of reasons. Such reasons may include a network disconnect (e.g., loss of connectivity to the network 102), loss of signal quality with respect to the network 102 (e.g., the signal strength of the network 106 may be increasing from the client's perspective while the signal strength of the network 102 may be decreasing from the client's perspective), movement of the client from an area serviced by the network 102 to an area serviced by the network 106, changing medium types (e.g., moving from a wired connection with the network 102 to a wireless connection with the network 106), etc.

When switching from one network to another, the client 104 may wish to maintain a communication session, such as a telephone call. In the present example, such a session may need to be maintained regardless of whether the network transition is a break and make process (i.e., the connection with the network 102 is broken before the connection with the network 106 is established) or a make and break process (i.e., the connection with the network 106 is established before the connection with the network 102 is broken).

Figure 1B:
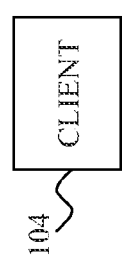
FIG. 1B is an embodiment of a device that may be used within the communications environment of FIG. 1A.

Referring to FIG. 1B, one embodiment of a device that may be used as the client 104 of FIG. 1A within the communications environment 100 is illustrated. The client 104 may include components such as a central processing unit ("CPU") 108, a memory unit 110, an input/output ("I/O") device 112, and a network interface 114. The network interface 114 may be, for example, one or more network interface cards (NICs) that are each associated with a media access control (MAC) address. The network interface 114 may support wired and/or wireless communications that enable the client 104 to connect to the networks 102 and 106. The components 108, 110, 112, and 114 are interconnected by one or more communications links 116 (e.g., a bus).

It is understood that the client 104 may be configured in many different ways. For example, the client 104 may be a mobile device, such as a cell phone, personal digital assistant (PDA), or laptop computer. In other embodiments, the client 104 may be a relatively stationary device, such as a personal computer or workstation. The client 104 may be relatively self-contained (e.g., as a PDA) or may include distributed components. For example, the client 104 may be differently configured from that shown in FIG. 1B and each of the listed components may actually represent several different components that may be distributed. For example, the CPU 108 may actually represent a multi-processor or a distributed processing system; the memory unit 110 may include different levels of cache memory, main memory, hard disks, and remote storage locations; and the I/O device 112 may include monitors, keyboards, and the like.

Figure 2:
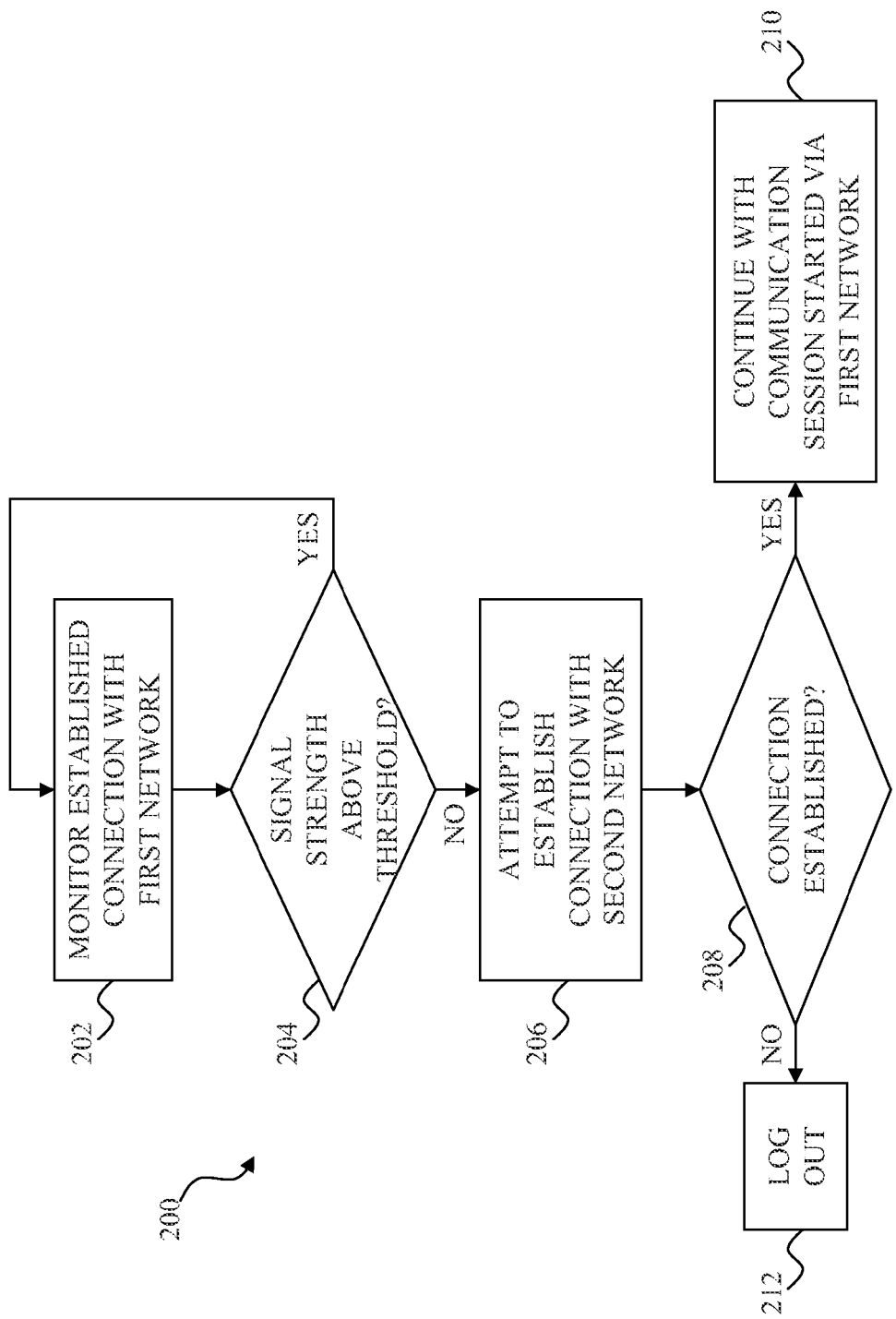
FIG. 2 is a flowchart illustrating one embodiment of a method for maintaining a communication session within the environment of FIG. 1A during a break and make network transition.

Referring to FIG. 2, a method 200 illustrates one embodiment of a break and make process that may be executed by the client 104 within the environment 100 of FIG. 1A. It is understood that the method 200 is performed by the client 104 and not by the networks 102 and 106. Accordingly, the method 200 may be executed with minimal usage of network resources.

In step 202, the client 104 monitors an established connection with the network 102. In the present example, the networks 102 and 106 are both wi-fi networks, and so the client 104 is in wireless communication with the network 102. For purposes of illustration, the monitoring is focused on the signal strength of the network 102 at the client 104, although it is understood that the monitoring may encompass many different aspects of the connection and the present disclosure is not limited to monitoring the signal strength of the connection.

Figure 3:
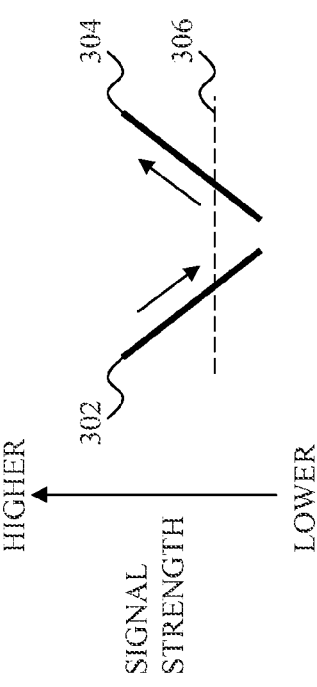
FIG. 3 illustrates one embodiment of a signal strength comparison that may be used by the method of FIG. 2.

With additional reference to FIG. 3, the signal strength 302 of the network 102 may be compared with the signal strength 304 of the network 106, which may also be monitored by the client 104. A threshold value 306, which may be configurable within the client 104, may be used by the client to determine whether to switch to the network 106. For example, if the signal strength 302 is declining (as indicated by the corresponding arrow in FIG. 3) and the signal strength 304 is increasing (as indicated by the corresponding arrow in FIG. 3), the signal strength 302 may be below the threshold 306 and the signal strength 304 may be above the threshold. In this case, the client 104 may be configured to switch to the network 106. In other embodiments, a delta value based at least partly on rate of change in signal strength may be used. For example, if the signal strength is rapidly declining, the client 104 may be configured to switch networks even though signal strength 302 is not yet below the threshold 306. While the switch is automatic in the present example, it is understood that such a switch may involve prompting a user for permission to switch networks in some embodiments. If no other network is available (e.g., the network 106 is not present), the client 104 may remain with the network 102 as long as a connection can be maintained, even if the signal strength 302 falls below the threshold 306. In other embodiments where multiple networks are available, the client 104 may be configured to switch to the network having the highest signal strength regardless of the threshold value.

Accordingly, in step 204, if the signal strength 302 is above the threshold 306, the method 200 returns to step 202 and continues monitoring the signal strength. If the signal strength 302 falls below the threshold 306, the method moves to step 206, where the client 104 attempts to establish a connection with the network 106. Step 206 may include obtaining network information from the network 106, such as IP address and port information.

If the attempt to establish the connection with the network 106 is successful as determined in step 208, the client 104 may continue with a communication session established via the network 102 in step 210. For example, if the client 104 was engaged in a telephone call with another client (not shown) via the network 102, the client 104 may automatically re-establish the call via the network 106 with the other client so that the call continues regardless of the network switch that has occurred. Other sessions, such as messaging sessions, may also be re-established. It is understood that the state of the client 104 with respect to active communication sessions prior to the switch is saved by the client and used to re-establish the sessions after the switch is performed. Accordingly, a user of the client 104 may not be aware of the switch and need take no action to continue the communication sessions. Furthermore, the networks 102 and 106 need not communicate regarding the switch, as the client 104 handles the switch itself.

If the attempt to establish the connection with the network 106 is not successful as determined in step 208, the client 104 may stay with the network 102, drop the connection, log out, or performed other actions in step 212.

Referring to FIG. 4, a method 400 illustrates one embodiment of a make and break process that may be executed by the client 104 within the environment 100 of FIG. 1A. It is understood that the method 400 is performed by the client 104 and not by the networks 102 and 106. Accordingly, the method 400 may be executed with minimal usage of network resources.

In step 402, the client 104 attempts to establish a connection with the network 106 while still connected to the network 102. Although not described in the present example, it is understood that the method 400 may include a monitoring process such as that described with respect to steps 202 and 204 of FIG. 2. In the present example, the network 102 is a wi-fi network and the network 106 is a WiMax network, and so the client 104 is in wireless communication with the network 102. Step 402 may include obtaining network information from the network 106, such as IP address and port information.

If the attempt to establish the connection with the network 106 is successful as determined in step 404, the client 104 may shut down the network interface with the network 102 in step 406. In step 408, the client 104 may use the information obtained in step 402 (e.g., IP address and port) to continue with a communication session originally established via the network 102 in step 408. For example, if the client 104 was engaged in a telephone call with another client (not shown) via the network 102, the client 104 may automatically re-establish the call with the other client via the network 106 so that the call continues regardless of the network switch that has occurred. Other sessions, such as messaging sessions, may also be re-established.

If the attempt to establish the connection with the network 106 is not successful as determined in step 404, the client 104 may attempt a break and make connection in step 410 as described with respect to FIG. 2. Alternatively, the client 104 may remain with the network 102, drop the connection, or log out in step 410.

Figure 5:
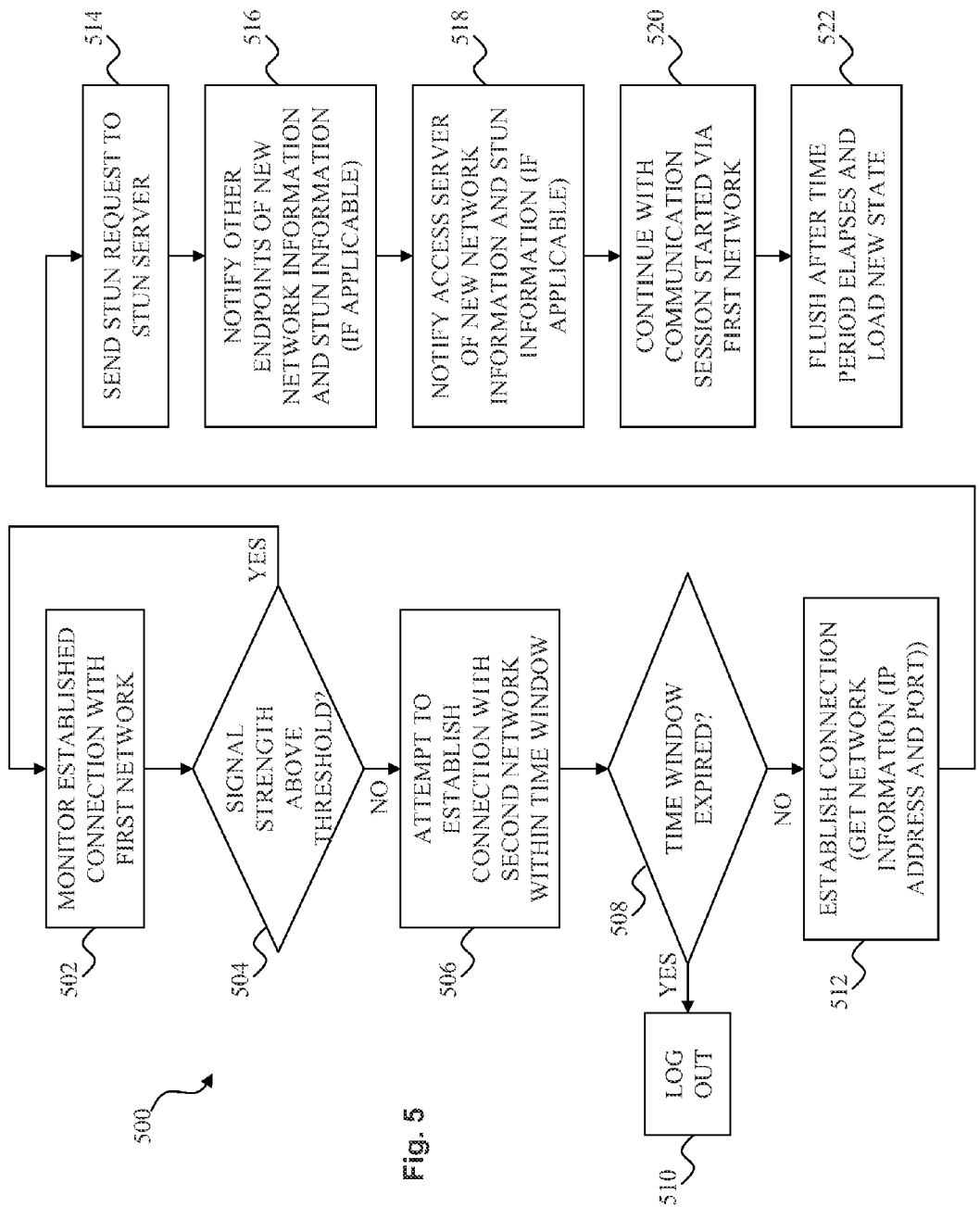
FIG. 5 is a flowchart illustrating another embodiment of a method for maintaining a communication session within the environment of FIG. 1A during a break and make network transition.

Referring to FIG. 5, a method 500 illustrates another embodiment of a break and make process that may be executed by the client 104 within the environment 100 of FIG. 1A. In the present example, the client 104 is an endpoint as described in previously incorporated U.S. patent application Ser. No. 11/081,068 and is coupled to an access server and a STUN server via the network 102.

In step 502, the client 104 monitors an established connection with the network 102. In the present example, the networks 102 and 106 are both wi-fi networks, and so the client 104 is in wireless communication with the network 102. Steps 502 and 504 may include signal strength monitoring or other monitoring as previously described with respect to FIG. 2.

In step 506, the client 104 attempts to establish a connection with the network 106. In the present example, the client 104 is configured to attempt to connect to the network 106 for a predefined window of time (e.g., ten or twenty seconds). If the client 104 cannot connect in that window, the method 500 logs the client 104 out in step 510 after determining that the window has expired in step 508.

As described in previously incorporated U.S. patent application Ser. No. 11/081,068, the client 104 may be in direct communication with other endpoints (not shown), the access server, and the STUN server. The endpoints may be configured to send "keep alive" messages to an endpoint from which they have not heard for a certain period of time. For example, if the client 104 loses its connection with the network 102, another endpoint may begin sending "keep alive" messages to the client 104 using the address and port information corresponding to the client 104 in the network 102. In the present example, the endpoint sending the "keep alive" messages may extend the period of time during which the "keep alive" are sent by adding the time window used in step 506 in order to give the client 104 additional time to re-establish the connection.

If the client 104 is able to connect to the network 106 during the time window as determined in step 508, the method 500 moves to step 512 and establishes the connection by obtaining such information as IP address and port information. It is understood that failure of certain processes (e.g., obtaining the IP address and port information) may indicate that the attempt to connect to the network 106 has failed. In step 514, the client 104 may send a STUN request to the STUN server to determine whether any network address translation (NAT) information has changed due to its switch from the network 102 to the network 106. In step 516, the client 104 notifies other endpoints (that are logged in) of its new IP address and port information and its updated STUN information (if applicable). In step 518, the client 104 notifies the access server of its new IP address and port information and its updated STUN information (if applicable). As steps 514, 516, and 518 are described in previously incorporated U.S. patent application Ser. No. 11/081,068, they are not described in detail herein.

In step 520, the client 104 may continue with a communication session established via the network 102 as previously described. In addition, after a period of time (e.g., ten seconds) elapses, the client 104 may flush its current state information and reload a fresh snapshot from the access server in step 522. This enables the client 104 to update its status with any information (e.g., a buddy request) it might have missed during the network switch.

Figure 6:
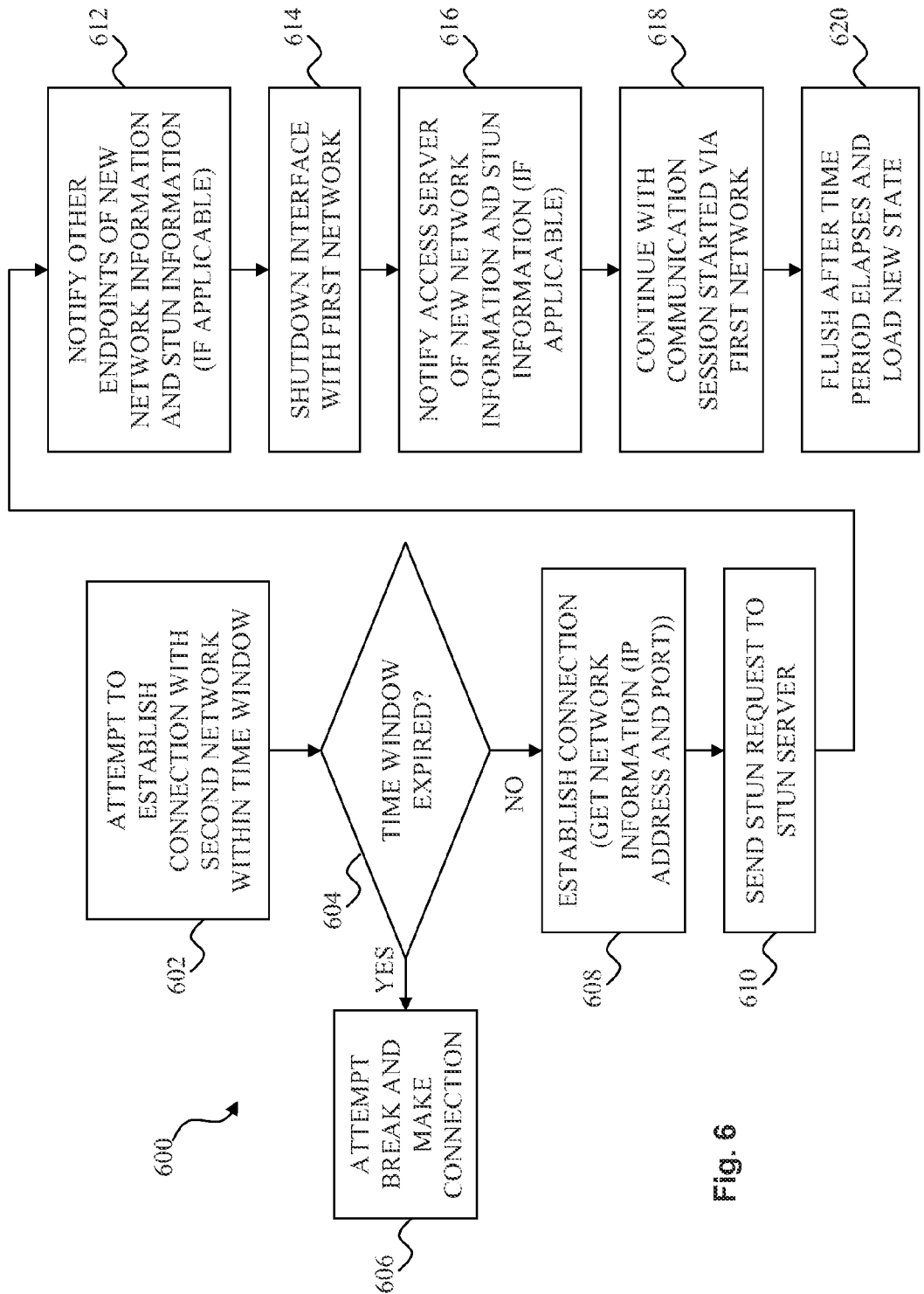
FIG. 6 is a flowchart illustrating another embodiment of a method for maintaining a communication session within the environment of FIG. 1A during a make and break network transition.

Referring to FIG. 6, a method 600 illustrates another embodiment of a make and break process that may be executed by the client 104 within the environment 100 of FIG. 1A. In the present example, the client 104 is an endpoint as described in previously incorporated U.S. patent application Ser. No. 11/081,068 and is coupled to an access server and a STUN server via the network 102.

In step 602, the client 104 attempts to establish a connection with the network 106 while still connected to the network 102. Although not described in the present example, it is understood that the method 600 may include a monitoring process such as that described with respect to steps 202 and 204 of FIG. 2. In the present example, the network 102 is a wi-fi network and the network 106 is a WiMax network, and so the client 104 is in wireless communication with the network 102.

In the present example, the client 104 is configured to attempt to connect to the network 106 for a predefined window of time (e.g., ten or twenty seconds) as described with respect to FIG. 5. If the client 104 cannot connect in that window, the method 600 may attempt the break and make process of FIG. 5 in step 606 after determining that the window has expired in step 604.

If the client 104 is able to connect to the network 106 during the time window as determined in step 604, the method 600 moves to step 608 and establishes the connection by obtaining such information as IP address and port information. In step 610, the client 104 may send a STUN request to the STUN server to determine whether any NAT information has changed due to its switch from the network 102 to the network 106. In step 612, the client 104 notifies other endpoints (that are logged in) of its new IP address and port information and its updated STUN information (if applicable). In step 614, the client 104 may shut down the network interface with the network 102. In step 616, the client 104 notifies the access server of its new IP address and port information and its updated STUN information (if applicable). As steps 610, 612, and 616 are described in previously incorporated U.S. patent application Ser. No. 11/081,068, they are not described in detail herein.

In step 618, the client 104 may continue with a communication session established via the network 102 as previously described. In addition, after a period of time (e.g., ten seconds) elapses, the client 104 may flush its current state information and reload a fresh snapshot from the access server in step 620. This enables the client 104 to update its status with any information (e.g., buddy request) it might have missed during the network switch.

While the preceding description shows and describes one or more embodiments, it will be understood by those skilled in the art that various changes in form and detail may be made therein without departing from the spirit and scope of the present disclosure. For example, various steps illustrated within a particular sequence diagram may be combined or further divided, and some steps may be performed in a different order than that shown. In addition, steps described in one diagram may be incorporated into another diagram. Furthermore, the described functionality may be provided by hardware and/or software, and may be distributed or combined into a single platform. Additionally, functionality described in a particular example may be achieved in a manner different than that illustrated, but is still encompassed within the present disclosure. Therefore, the claims should be interpreted in a broad manner, consistent with the present disclosure.

What is claimed is:

1. A method comprising:
monitoring, by a first communication device, a first connection with a first network to determine whether a signal strength of the first connection falls below a threshold value, wherein the first connection is used by the first communication device for a peer-to-peer communication session with a second communication device;
establishing, by the first communication device, a second connection with a second network if the signal strength of the first connection falls below the threshold value, wherein establishing the second connection includes obtaining an address and port assignment corresponding to the first communication device from the second network; and
maintaining, by the first communication device, the peer-to-peer communication session during the changeover from the first connection to the second connection using the obtained address and port assignment, wherein the maintaining includes:
saving, by the first communication device, a current state of the first communication device prior to terminating the first connection, wherein the saved current state includes information about the peer-to-peer communication session;
using, by the first communication device, the saved current state to re-establish the peer-to-peer communication session after the changeover to the second connection; and
refreshing, by the first communication device, the saved current state with a new current state obtained from a server after the changeover to the second connection, wherein the refreshing updates the first communication device with information not received by the first communication device during the changeover.

2. The method of claim 1 wherein the communication session is a telephone call.

3. The method of claim 1 wherein the communication session is a messaging session.

4. The method of claim 1 further comprising selecting, by the first communication device, the second network from a plurality of available networks prior to establishing the second connection.

5. The method of claim 1 further comprising:
determining, by the first communication device, that there is updated network address translation (NAT) information corresponding to the first communication device after switching from the first network to the second network; and
sending, by the first communication device, the updated NAT information to the second communication device.

6. The method of claim 1 further comprising sending, by the first communication device, the network address to the second communication device.

7. A method comprising:
establishing, by a first communication device, a second connection with a second network after determining that a signal strength of a first connection with a first network has passed a defined criterion, wherein establishing the second connection includes obtaining a network address corresponding to the first communication device from the second network;
saving, by the first communication device, a current state of the first communication device prior to terminating the first connection, wherein the current state includes information needed to maintain an active communication session occurring between the first communication device and a second communication device;
using, by the first communication device, the saved current state and the network address to re-establish the active communication session via the second connection; and
refreshing, by the first communication device, the saved current state with a new current state obtained by the first communication device after the changeover to the second connection, wherein the refreshing updates the first communication device with information not received by the first communication device during the changeover.

8. The method of claim 7 wherein the defined criterion is a threshold value.

9. The method of claim 7 wherein the defined criterion is a delta value.

10. The method of claim 7 wherein determining that the signal strength has passed the defined criterion is based on a rate of change in the signal strength.

11. The method of claim 7 further comprising obtaining, by the first communication device, the new current state from an access server in a peer-to-peer network.

12. The method of claim 7 further comprising:
obtaining, by the first communication device, updated network address translation (NAT) information corresponding to the first communication device after switching from the first network to the second network; and
sending, by the first communication device, the updated NAT information to the second communication device.

13. The method of claim 7 further comprising receiving, by the first communication device from a user of the first communication device, permission to switch from the first network to the second network prior to establishing the second connection.

14. A device comprising:
a network interface;
a processor coupled to the network interface;
a memory coupled to the processor; and
a plurality of instructions stored in the memory for execution by the processor, the instructions including instructions for:
establishing a second connection with a second network after determining that a signal strength of a first connection with a first network has passed a defined criterion, wherein establishing the second connection includes obtaining a network address corresponding to the first communication device from the second network;
saving a current state of the device prior to terminating the first connection, wherein the current state includes information needed to maintain an active communication session between the device and another device;
using the saved current state and the network address to re-establish the active communication session via the second connection; and
refreshing the saved current state with a new current state obtained by the device after the changeover to the second connection, wherein the refreshing updates the device with information not received by the device during the changeover.

15. The device of claim 14 wherein the defined criterion is a threshold value.

16. The device of claim 14 wherein the defined criterion is a delta value.

17. The device of claim 14 wherein determining that the signal strength has passed the defined criterion is based on a rate of change in the signal strength.

18. The device of claim 14 further comprising instructions for obtaining the new current state from an access server in a peer-to-peer network.

19. The device of claim 14 further comprising instructions for:
   obtaining updated network address translation (NAT) information corresponding to the device after switching from the first network to the second network; and
   sending the updated NAT information to the other device participating in the active communication session.

20. The device of claim 14 further comprising instructions for receiving permission from a user of the device prior to establishing the second connection.

\* \* \* \* \*